US005996809A

United States Patent [19]

Chiasson

[11] Patent Number: 5,996,809

[45] Date of Patent: Dec. 7, 1999

[54] FLATWARE SORTING MACHINE

[76] Inventor: Robert H. Chiasson, c/o East Coast Industries, Inc. 2532 Main St., Concord, Mass. 01742

[21] Appl. No.: 08/852,088

[22] Filed: May 7, 1997

[51] Int. Cl.[6] .......................... B07C 5/344; B65G 17/32

[52] U.S. Cl. .......................... 209/636; 209/904; 209/919; 209/926; 198/443; 198/679; 198/681; 198/803.6

[58] Field of Search .......................... 209/636, 904, 209/907, 919, 926; 198/678.1, 679, 681, 690.1, 803.6, 443

[56] References Cited

U.S. PATENT DOCUMENTS 3,948,386 4/1976 Nalbach .......................... 198/443 X
4,220,240 9/1980 Narberg et al. .......................... 198/681 X
4,744,469 5/1988 Swallert .......................... 209/926 X
5,379,880 1/1995 Stone et al. .......................... 198/679 X

FOREIGN PATENT DOCUMENTS 2170737 8/1986 United Kingdom .......................... 209/926

*Primary Examiner*—Tuan N. Nguyen
*Attorney, Agent, or Firm*—Iandiorio & Teska

[57] ABSTRACT

A flatware sorting machine including a feed bin for holding unsorted flatware, a sorting system for sorting the flatware, and a flatware pick-up and transport system for retrieving the flatware from the feed bin and transporting them to the sorting system.

16 Claims, 12 Drawing Sheets

FLATWARE SORTING MACHINE

FIELD OF INVENTION

This invention relates to a flatware sorting machine which, in its preferred embodiment, automatically sorts flatware not only according to type (fork, teaspoon, soup spoon and knife) but also according to orientation (handle up, head down; handle down, head up).

BACKGROUND OF INVENTION

Manually sorting flatware according to type and orientation is a time consuming and tedious labor intensive task at restaurants and cafeterias such as cafeterias at major universities where thousands of pieces of flatware are used and must be washed each day.

At such facilities, dirty flatware is normally dumped unsorted into a tray for washing in an automatic dishwasher. After washing, the individual pieces of flatware are then manually sorted according to type and placed handle down in individual knife, fork, teaspoon, and soup spoon bins for a sanitizing cycle in the dishwasher. The reason the flatware is placed handle down is so that the sanitizing solution drips off the head of the flatware during the sanitizing cycle.

After sanitization, the flatware is then manually transferred to serving trays or bins, usually handle end up.

The need for automatic flatware sorting machines was recognized in U.S. Pat. No. 4,954,250. Unfortunately, the apparatus disclosed therein was excessively large, did not always sort the flatware properly according to type, and, in any case, did not automatically orient the flatware for the sanitizing cycle. Thus, this apparatus still required a fair amount of manual labor.

Other attempts at manufacturing a fully automatic flatware sorting machine have also failed. As discussed in the '250 patent, complex image recognition systems have been developed in an attempt to sort flatware both according to type and orientation but such systems exhibit high failure rates, low reliability, and are not robust enough to withstand the harsh kitchen environment where they are used.

Thus, there is a need for a fairly compact, robust, highly reliable, and fully automatic flatware sorting machine which sorts flatware not only according to type but also according to orientation to eliminate the tedious manual labor associated with sorting operations in restaurants and cafeterias.

SUMMARY OF INVENTION

It is therefore an object of this invention to provide an improved flatware sorting machine.

It is a further object of this invention to provide such a flatware sorting machine which sorts flatware not only according to type but also according to orientation.

It is a further object of this invention to provide such a flatware sorting machine which eliminates the time consuming and tedious labor intensive task of sorting flatware according to type and orientation.

If is a further object of this invention to provide such a flatware sorting machine which is relatively compact, and highly reliable.

It is a further object of this invention to provide such a flatware sorting machine which is robust enough to withstand the harsh kitchen environment wherein it is to be used.

This invention results from the realization that a properly working and reliable flatware sorting machine which sorts the flatware according to both type and orientation can be accomplished by a unique sombrero-shaped rotating feed bin which initially orients the unsorted flatware to all lie in the same general direction, and a magnetic-based flatware pick-up and transport system which transfers the flatware one piece at a time from the feed bin to a sorting system which includes two sorting stations: a first station which sorts all handle end down flatware according to type and a second sorting station which sorts all handle end up flatware according to type. If, however, there is no need to orient the flatware handle end up or handle end down in a particular implementation, the sorting system can be simplified or replaced with compatible sorting systems. Thus, one primary focus of the invention herein is the unique flatware pick-up and transfer system.

This invention features a flatware sorting machine including a feed bin for holding unsorted flatware, a sorting system for sorting the flatware, and a flatware pick-up and transport system for retrieving the flatware from the feed bin and transporting them to the sorting system. The flatware pick-up and transport system includes a transport mechanism such as a belt, a plurality of individual flatware grasping mechanisms such as magnetic members connected to the belt for retrieving individual pieces of flatware from the feed bin, and a drive subsystem such as a pair of spaced pulleys for driving the belt to bring the magnetic members into contact with the unsorted flatware in the feed bin and for transporting the magnetic members and the individual pieces of flatware attached thereto to the sorting system. Finally, there are some means, such as a knock-off bar, for transferring the flatware from the magnetic member to the sorting system.

The feed bin preferably includes a circular trough for orienting all the unsorted flatware to lie in the same general direction. Further included is a motor for rotating the feed bin, preferably at a rate slower than the speed of the transport belt.

The magnetic members typically are connected to the belt grasping via a flexible member such as a chain. The magnetic members preferably have a blunt tip portion.

In an alternative embodiment, there are means for varying the magnetic strength of each magnetic member. For example, there may be a pair of magnets disposed within a hollow body and separated by a spacing spring. A driver set screw in contact with one magnet through the body allows adjustment of the spacing between the two magnets.

The drive subsystem typically includes an upper pulley and a lower pulley for the belt. The upper pulley is disposed over the sorting system and the lower pulley is disposed over the feed bin. Also included is a tensioner for maintaining the tension on the belt. The upper pulley is preferably disposed at a different elevation than the lower pulley. The drive subsystem further includes a motor for rotating one of the upper and lower pulleys. The flatware pick-up and transport mechanism system preferably includes a knock-down mechanism for dislodging a piece of flatware picked up by two adjacent magnetic members.

The sorting system typically includes a frame portion defining a first sorting station for sorting flatware handle-end down and a second sorting station for sorting flatware handle-end up, and a rotating portion disposed within the frame. The rotating portion includes a plurality of feed hoppers disposed to receive flatware from the pick-up and transport mechanism, a corresponding plurality of sorting jaw members disposed beneath the feed hoppers and operable between a closed position and plurality of sequentially wider open positions, and means such as a cam mechanism for sequentially opening and closing the jaw members to sort the flatware according to type.

The frame portion may include a stationary upper cam having an open section proximate the first sorting station. Each vertically oriented feed hopper includes a cam follower which cooperates with the stationary upper cam and a spring based pivoting mechanism which allows the feed hoppers to tilt at the open section of the stationary upper cam proximate the first sorting station. The frame portion also may include a stationary lower cam having a step down portion section between the first sorting station and the second sorting station.

The rotating portion then includes a plurality of spring-biased lifter blocks each disposed beneath the sorting jaw members. The lifter blocks each include a cam follower which cooperates with the lower stationary cam to allow the lifter blocks to spring up towards the jaw members at the step down portion of the stationary lower cam. The pivoting feed hoppers function to trap handle-up flatware pieces therein until they pass the first sorting station and the lifter blocks function to push the flatware up above the sorting jaws to allow them to close prior to sorting at the second sorting station.

In more general terms, the sorting system includes: means for sorting flatware according to type, and means for sorting flatware according to orientation. The means for sorting flatware according to type includes a plurality of sorting jaw members operable between a closed position and a plurality of different open positions. The means for sorting flatware according to orientation includes two separate sorting stations: a first sorting station for sorting flatware oriented handle end down according to type and a second sorting station for sorting flatware oriented handle end up according to type. The first station includes means for capturing the handle of flatware oriented handle end up until it reaches the second sorting station. The means for capturing includes a stationary upper cam and a plurality of pivotable, spring-biased feed hoppers disposed above the sorting jaw members. Each feed hopper includes a cam follower which cooperates with the upper stationary cam to maintain the hoppers in a vertical orientation, the upper stationary cam including an open portion proximate the first sorting station where the hoppers are free to pivot thereby wedging the handle of the flatware oriented handle end up in the feed hopper. The means for sorting further includes a lower stationary cam and a plurality of spring-biased pivotable lifter blocks disposed below the sorting jaw members. Each lifter block includes a cam follower which cooperates with a lower stationary cam to selectively orient the lifter blocks with respect to the sorting jaw members. The stationary lower cam has a step down portion between the first sorting station and the second sorting station for allowing the lifter blocks to pivot upward thereby pushing flatware oriented handle end up above the jaw members so they can close prior to the second sorting station.

The sorting system further includes a camming mechanism for sequentially opening the sorting jaw members to wider spacings at the first sorting station, for closing the jaw members before the second sorting station, and for again sequentially opening the jaw members to wider spacings at the second sorting station, and for then closing the jaw members.

In a preferred embodiment, the distal ends of adjacent magnetic members are oriented with the same polarity to prevent attraction therebetween and there are means for driving the flatware pick-up and transport system at a rate faster than the rotation speed of the feed bin.

This invention also features a flatware pick-up and transport system for a flatware sorting machine. The sorting machine may be as disclosed in this specification or may be of a different configuration. The pick-up and transport system includes a transport mechanism such as a belt or chain, a plurality of magnetic members coupled to the transport mechanism for retrieving individual pieces of flatware, and a drive subsystem for driving the transport mechanism to bring the magnetic members into contact with unsorted flatware and for transporting the magnetic members to the sorting device.

This invention also includes a flatware sorting machine comprising a rotatable feed bin including a circular trough, a sorting device for sorting flatware, a flatware pick-up and transport system including a plurality of individual magnetic members coupled to a rotating member to bring the magnetic members into contact with unsorted flatware in the rotating feed bin and for transporting the magnetic members proximate the sorting device, and means for transferring the flatware from the magnetic members to the sorting device. Further included may be means for driving the rotatable feed bin at a rate slower than the rotating member of the flatware pick-up and transport system. The rotating member is preferably a belt but may also be a chain.

DISCLOSURE OF PREFERRED EMBODIMENT

Other objects, features and advantages will occur to those skilled in the art from the following description of a preferred embodiment and the accompanying drawings, in which.

Figure 1:
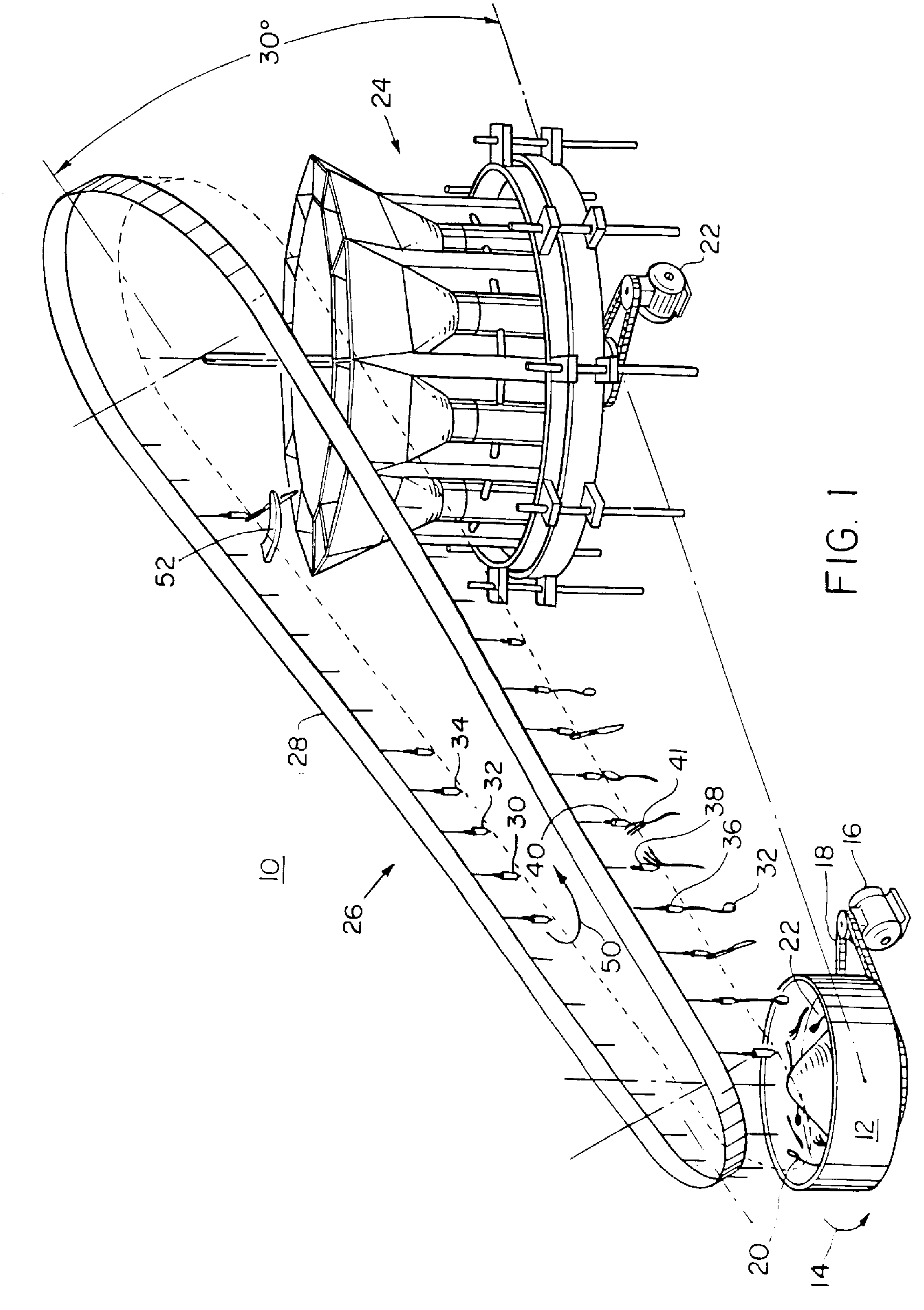
FIG. 1 is a schematic view of the flatware sorting machine of this invention.

Flatware sorting machine 10, FIG. 1, according to this invention includes sombrero-shaped feed bin 12 rotatable in the direction shown by arrow 14 by motor 16 and chain or belt drive 18. Unsorted flatware 20 is urged down towards circular trough 22 of feed bin 12 which functions to orientate all unsorted flatware to lie in the same general direction.

Machine 10 also includes sorting system 24 which sorts flatware delivered to it by flatware pick-up and transfer system 26 according to both type (fork, teaspoon, soup spoon, and knife) and orientation (handle up, handle down).

Pick-up and transport system 26 includes a transport mechanism, preferably belt 28 (but a chain drive could be used), and a plurality of individual flatware grasping means 30, 32, 34, 36, 38, and 40.

Figure 2:
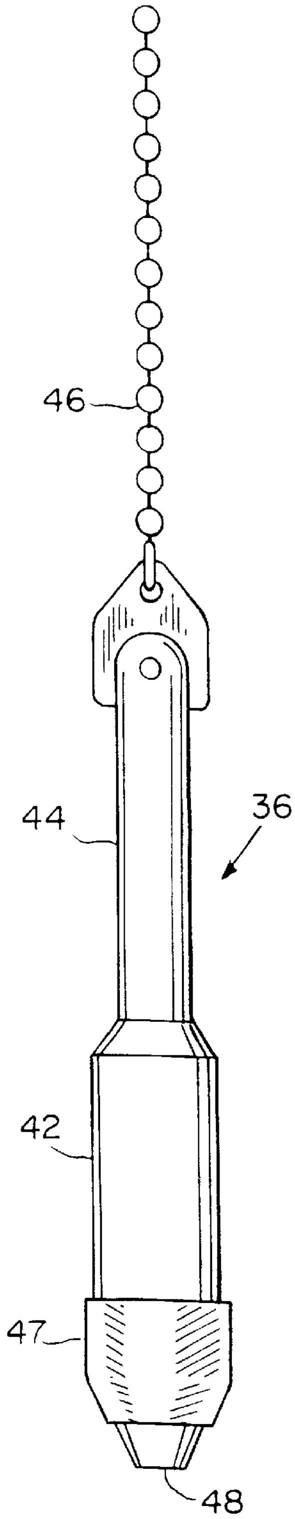
FIG. 2 is a schematic view of a single magnetic flatware grasping member of this invention.

In a preferred embodiment, such means include magnetic member 42, FIG. 2, connected to shaft 44 which is flexibly coupled to belt 28, FIG. 1, via flexible chain 46, FIG. 2. Conical shaped blunt tip 48 of magnetic member 42 has a diameter of about 0.125 inches. This configuration allows the flatware to hang properly during the transport from the feed bin to the sorting system. Adjacent magnetic members 30, 32, FIG. 1, for example, are oriented to have the same polarity on the distal blunt tip end thereof to prevent magnetic member 32 from being attracted to magnetic member 30. Plastic or insulative sleeve 47 also helps to keep adjacent magnets from being attracted to each other. The spacing between adjacent magnetic members 30, 32 on belt 28 is approximately 6 inches and chain 46, FIG. 2 is approximately 3 inches long. Magnetic member 42 is approximately 0.38 inches in diameter and when coupled to shaft 44 is approximately 2.38 inches long. Magnetic members 30, 32 could be permanent magnets or electromagnets.

In operation, belt 28 rotates in the direction shown by arrow 50, FIG. 1, to bring all the individual magnetic members, e.g., 30, 32, and 34 into contact with the unsorted flatware in rotating feed bin 12. The flatware is then transported by belt 28 one piece at a time to sorting system 24 until the magnetic members strike knock-off bar 52 which dislodges the flatware from the magnetic members to fall into the upper hopper receptacles of sorting system 24, discussed in more detail in reference to FIGS. 8–11.

In the preferred embodiment of this invention, feed bin 12 rotates at a speed approximately 30–40 percent slower than the speed of belt 28. So, for example, if feed bin 12 operates at approximately 4 rpm, belt 28 operates at approximately 6 rpm.

This feature insures that each magnetic member is dragged over the multiple pieces of flatware in feed bin 12 for a sufficient period of time to contact one piece of flatware. In addition, the dragging action helps to urge the blunt tip portion 48, FIG. 2, of each magnetic member towards the distal end of an individual piece of flatware for easier sorting operations. It is also important that belt 28 be tilted at approximately a 30° angle from horizontal so that the magnetic members are first brought into contact with the flatware in feed bin 12 and then transported up and over sorting system 24. Feed bin 12 is placed at an elevation with respect to belt 28 so that the blunt tip portion 48, FIG. 2, of each magnetic member almost touches the bottom of trough 22, FIG. 1, of feed bin 12 thus insuring that the pick-up and transfer system works properly irrespective of whether feed bin 12 is completely full, or nearly empty. Sorting system 24 is placed at an elevation relative to belt 28 so that blunt tip portion 48, FIG. 2, of each magnetic member just clears the upper extent of each upper hopper receptacle of sorting system 24, FIG. 1, shown in more detail in FIGS. 8–11. In practice, machine 10 reliably sorts one piece of flatware both according to type and orientation approximately each second.

Figure 3:
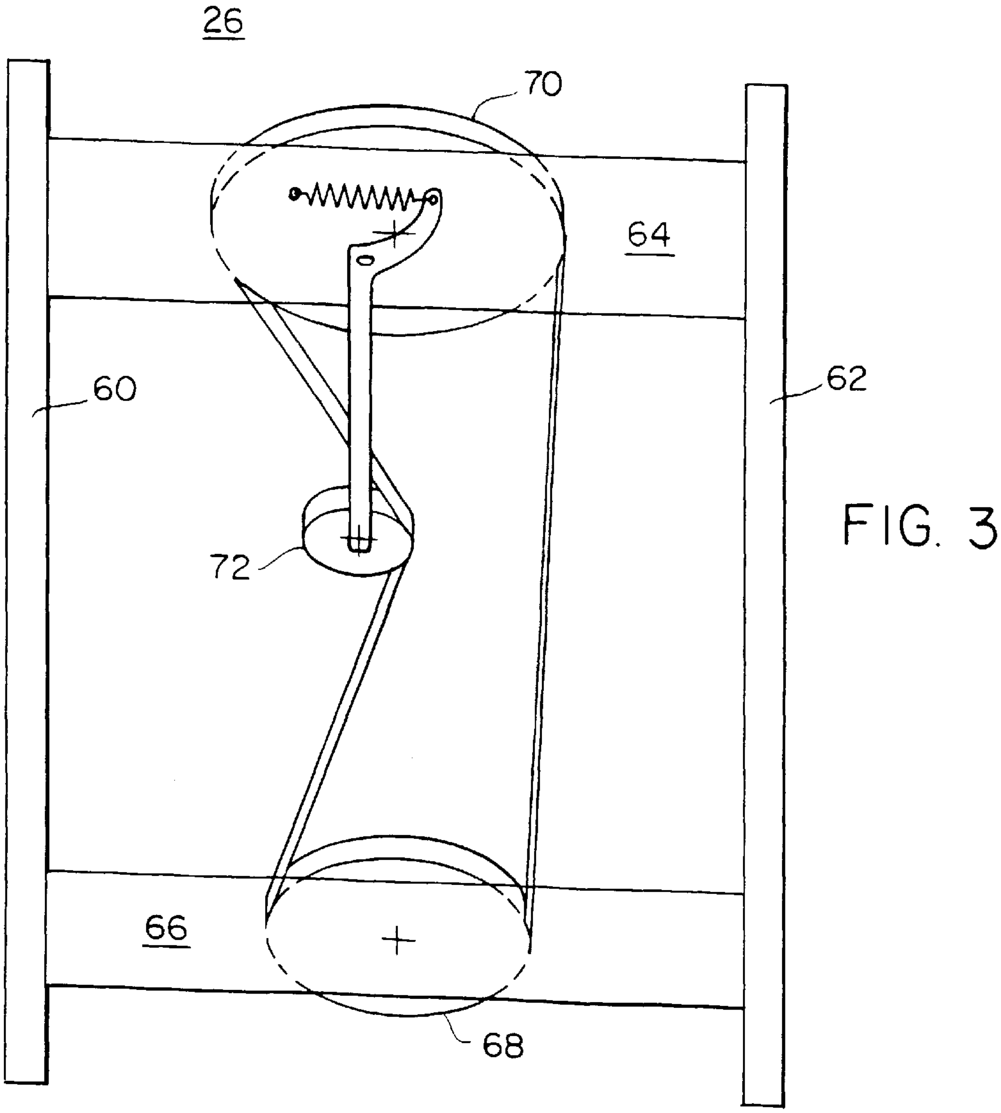
FIG. 3 is a top view of the flatware transport mechanism and drive subsystem of this invention.
Figure 4:
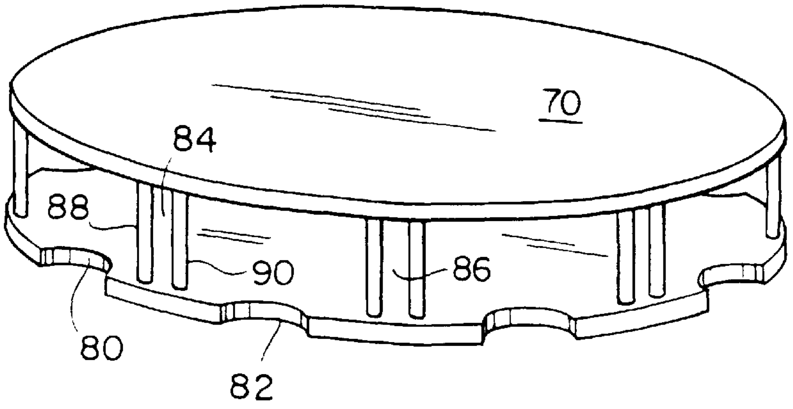
FIG. 4 is a schematic view of the upper pulley of the subsystem shown in FIG. 3.
Figure 5:
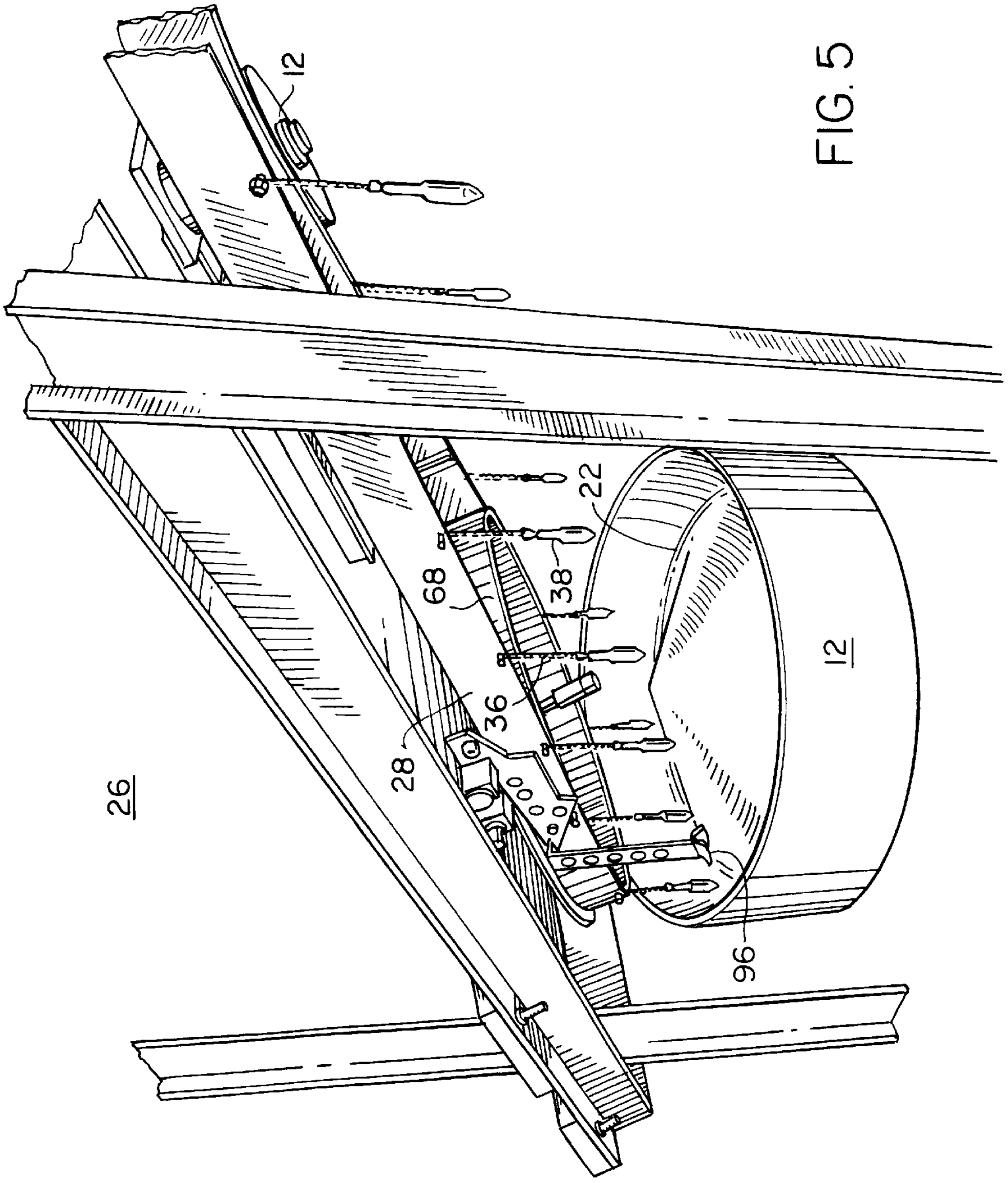
FIG. 5 is a more detailed schematic view of the feed bin section of the flatware sorting machine shown in FIG. 1.

Pick-up and transport system 26, FIG. 3, includes frame members 60, 62, 64, and 66 for fixing lower rotating pulley 68 at the desired 30° angle over feed bin 12, FIG. 1, and upper pulley 70, FIG. 3, disposed at the same angle over sorting system 24, FIG. 1. The general orientation of lower pulley 68 with respect to feed bin 12 of flatware pick-up and transport system 26 is shown in FIG. 5. Tensioning mechanism 72, FIG. 3, operates to keep the proper tension on belt 28 as is known. Upper pulley 70, FIG. 4, includes cut-out portions 80, 82 on the lower portion thereof for allowing the individual magnetic members to maintain their vertically hanging orientation when the transport belt contacts upper pulley 70. Lower pulley 68, FIG. 5, includes the same cut-out portions. Upper pulley 70, FIG. 4 also includes slots 84, 86, defined by spaced adjacent dowels 88 and 90 as shown for slot 84 which cooperate with spaced ribs on belt 28, FIG. 3 to prevent slippage of belt 28 relative to pulley 70. One such rib is shown at 90 in FIG. 6.

Figure 6:
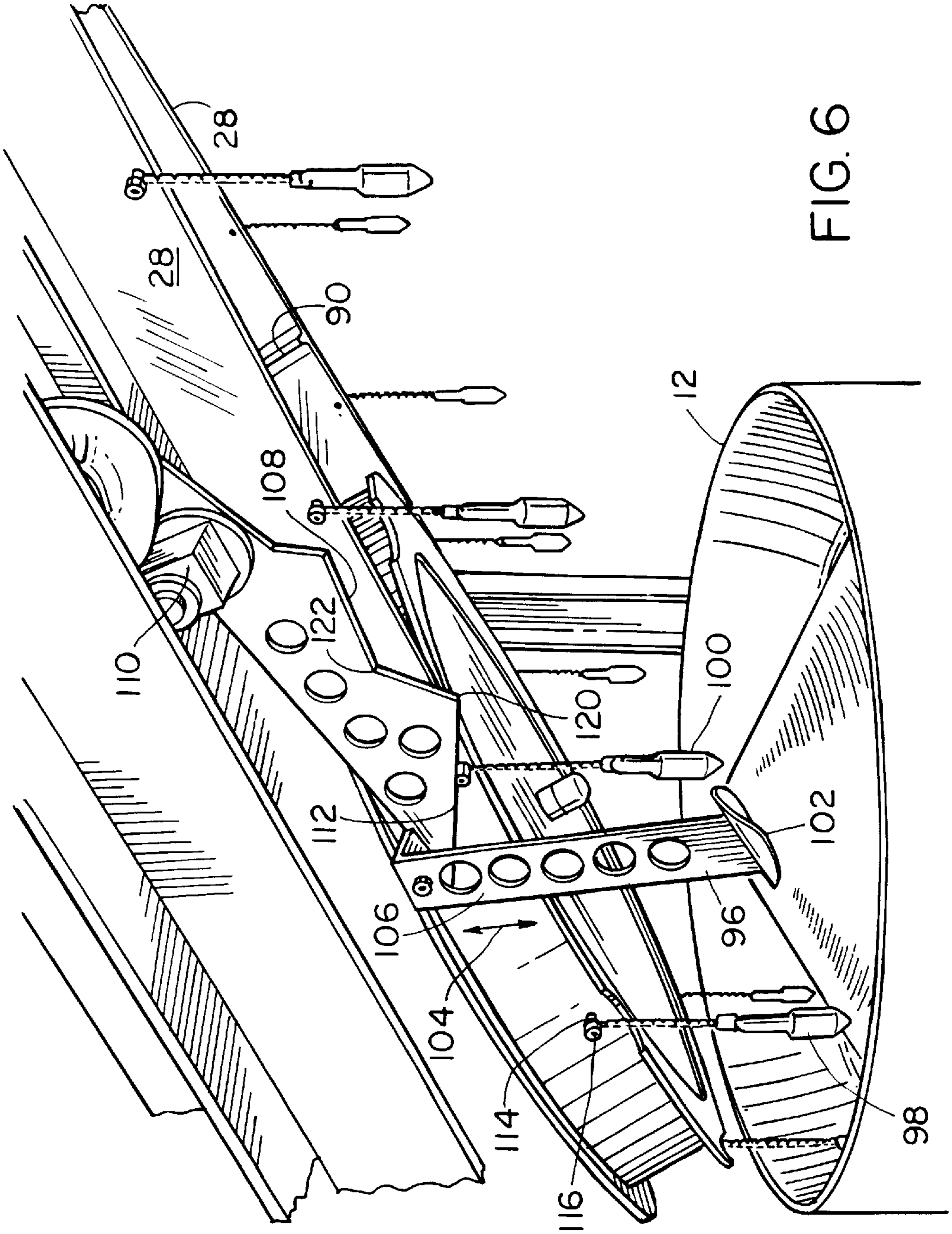
FIG. 6 is a schematic view of the knock-down mechanism of this invention for dislodging a piece of flatware picked up by two adjacent magnetic members.

Also shown in FIG. 6 is knock-down mechanism 96. In instances where an individual piece of flatware, such as a knife, is picked up by adjacent magnetic members 98 and 100, knock-down plate 102 is driven up and down in the direction shown by arrow 104 to dislodge the knife from magnetic member 98 so that it hangs vertically only from magnetic member 100. Knock-down plate 102 is attached to vertical bar 106 which, in turn, is attached to horizontal bar 108 which pivots about point 110. Horizontal bar 108 includes angled face 112 which rests on shaft 114 of fastener 116 which connects each magnetic member 98, 100 via their respective chains to belt 28. In this way, knock-down plate 102 travels upward and out of the way until the furthest extent of angled face 112 as shown at 120 is reached. Then, horizontal member 108 drops down into recess 122 thereby driving knock-down plate 102 downward at a point directly between adjacent magnetic members 98 and 100 to dislodge a piece of flatware attached to both members 98 and 100 so that it only hangs vertically from one member.

Figure 7:
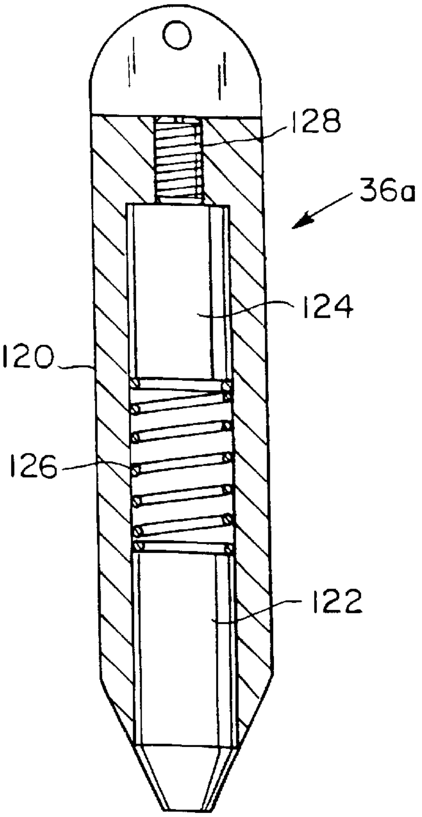
FIG. 7 is a side view of a variable strength magnetic flatware grasping member in accordance with this invention.

In an alternative embodiment, each magnetic member includes some means for varying its magnetic strength as shown for magnetic member 36*a*, FIG. 7. Magnetic member 36*a* has an aluminum outer hollow body 120 and a pair of magnets 122 and 124 disposed therein and separated by spacing spring 126. A driver, such as set screw 128 is then adjusted to adjust the spacing between magnets 122 and 124 to thereby tune the strength of the magnetic member for a specific implementation depending on the type and weight of the flatware used at the facility where the sorting machine is installed.

The components of sorting system 24, FIG. 1, are shown in more detail in FIGS. 8–16. Sorting system 24, FIG. 8, includes rotating portion 140 and fixed frame portion 142. Rotating portion 140 includes twelve upper hopper receptacles 144, and twelve corresponding pivotable feed hoppers 146. There are also twelve corresponding lower hopper receptacles 148 disposed under each feed hopper. There are also twelve corresponding pairs of sorting jaws 150, 152 disposed under each lower hopper receptacle and operable between a closed position and a plurality of different open positions. There are also twelve corresponding lifter blocks disposed adjacent to and partially beneath each pair of sorting jaws as shown for lifter block 154.

Upper hopper receptacle 144 receives a single piece of flatware at a time after it is separated from the magnetic members via knock-off bar 52. Thus, each upper hopper receptacle functions to urge individual pieces of flatware delivered to it from pick-up and transport system 26, FIG. 1, into each feed hopper which, in turn, functions to feed the individual flatware pieces through the lower hopper receptacles and to the sorting jaws.

Figure 8:
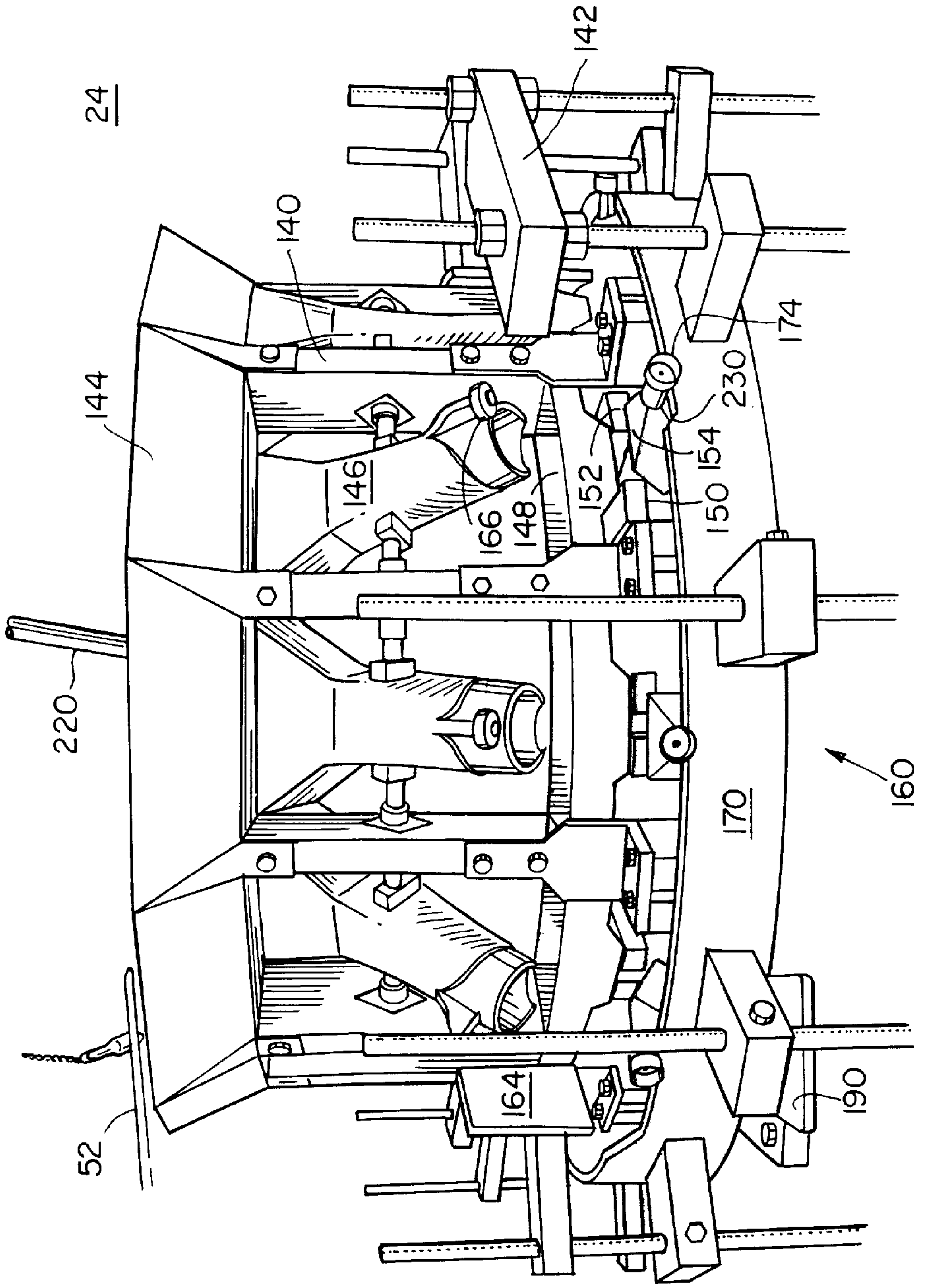
FIG. 8 is a front schematic view of the sorting system shown in FIG. 1.

The combination of rotating portion 140, FIG. 8, and fixed frame portion 142 of sorting system 24 defines two opposing sorting stations. At first sorting station 160, FIGS. 8 and 9, the flatware is sorted according to type handle side down. At second sorting station 162, FIGS. 9 and 10, which is directly opposite first sorting station 160, all handle side up flatware is sorted according to type.

Figure 9:
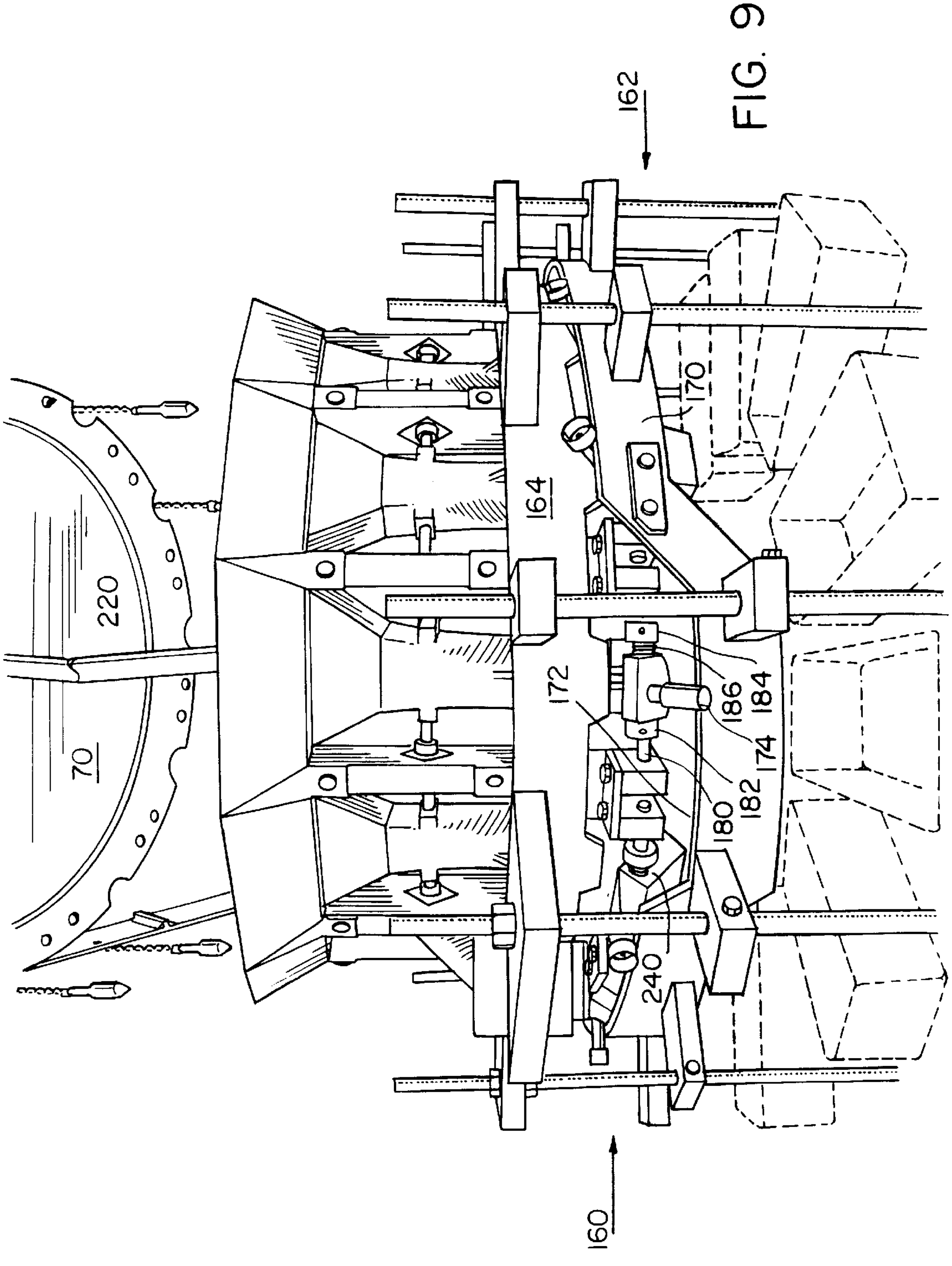
FIG. 9 is a right side schematic view of the sorting system shown in FIG. 8.

To accomplish this task, fixed frame portion 142 includes upper stationary cam 164, FIG. 9, which has an open portion proximate first sorting station 160 as shown in FIG. 8. Each vertically oriented feed hopper includes cam follower 166 in the form of a roller which cooperates with upper stationary cam 164 and a spring-biased pivoting mechanism shown in more detail in FIG. 12 which allows each feed hopper to tilt at the open portion of upper stationary cam 164 proximate first sorting station 160 as shown for feed hopper 146, FIG. 8.

Fixed frame portion 142 further includes lower stationary cam 170 which is uniform in width except at step down portion 230 just after first sorting station 160 and also at step down portion 172, FIG. 9, located just before second sorting station 162. Each lifter block, as shown for lifter block 154, includes a cam follower in the form of roller 174 which cooperates with lower stationary cam 170 to change the angle of each lifter block as a function of the width of lower stationary cam 170. Each lifter block is disposed to rotate beneath its corresponding jaw members as shown in FIG. 9 and pivotably resides on shaft 180 via bearings 182, 184, and spring 186 which is biases cam follower 174 against lower fixed cam 170.

Figure 10:
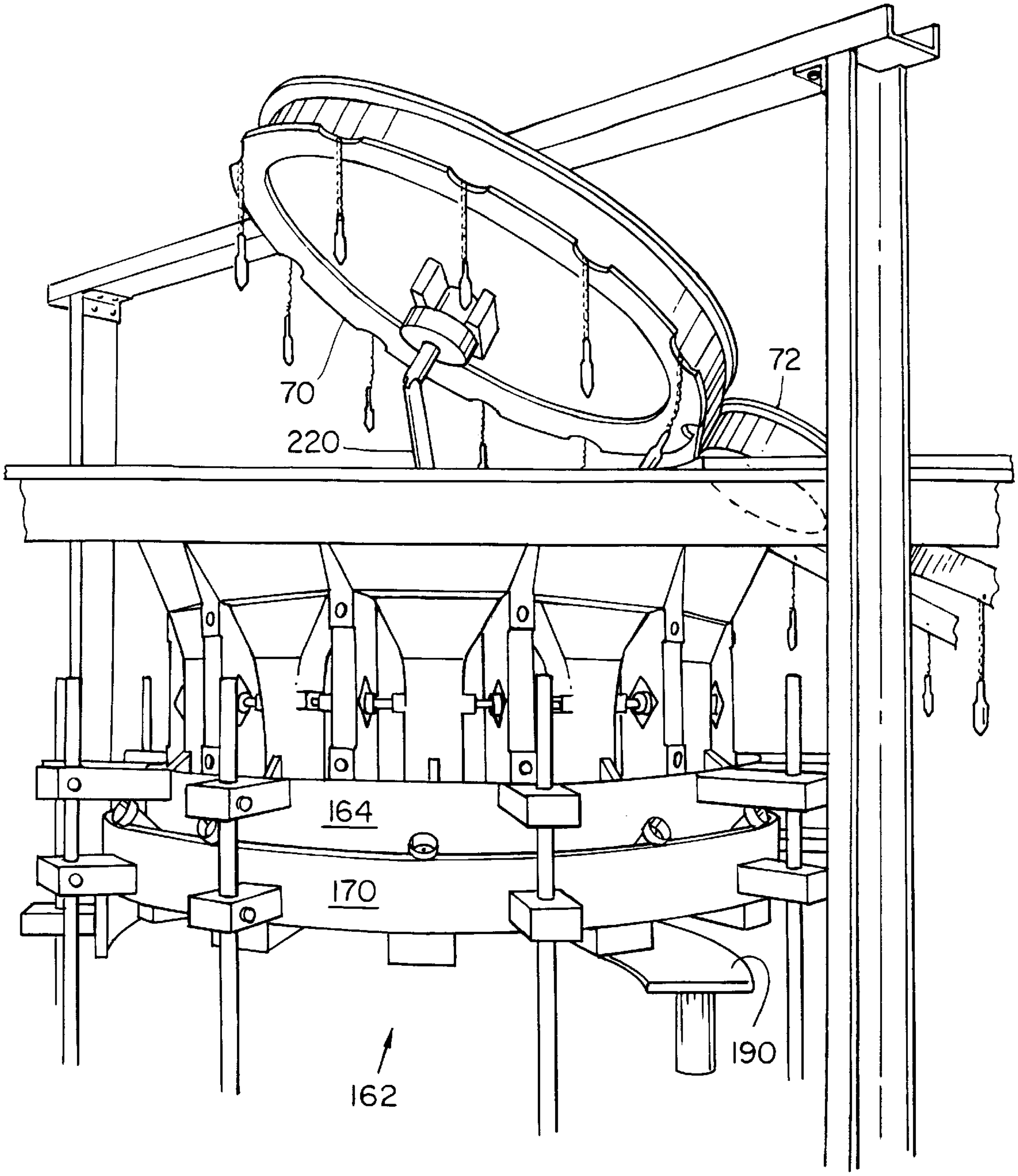
FIG. 10 is a rear schematic view of the sorting system shown in FIG. 8.
Figure 11:
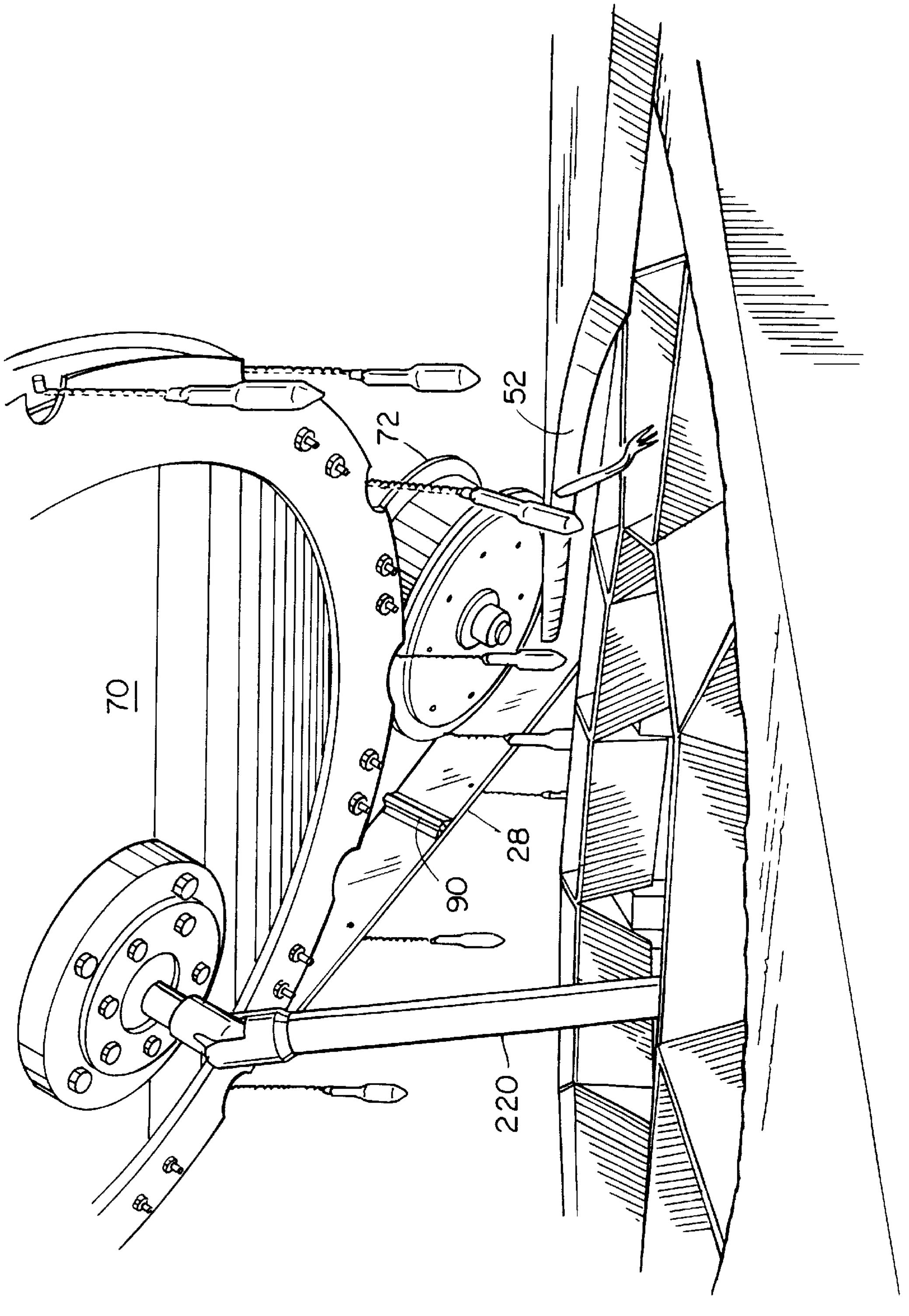
FIG. 11 is a schematic view of the flatware sorting machine of this invention showing the operation of the knock-off bar which transfers flatware from the individual magnetic grasping members to the sorting system in accordance with this invention.
Figure 12:
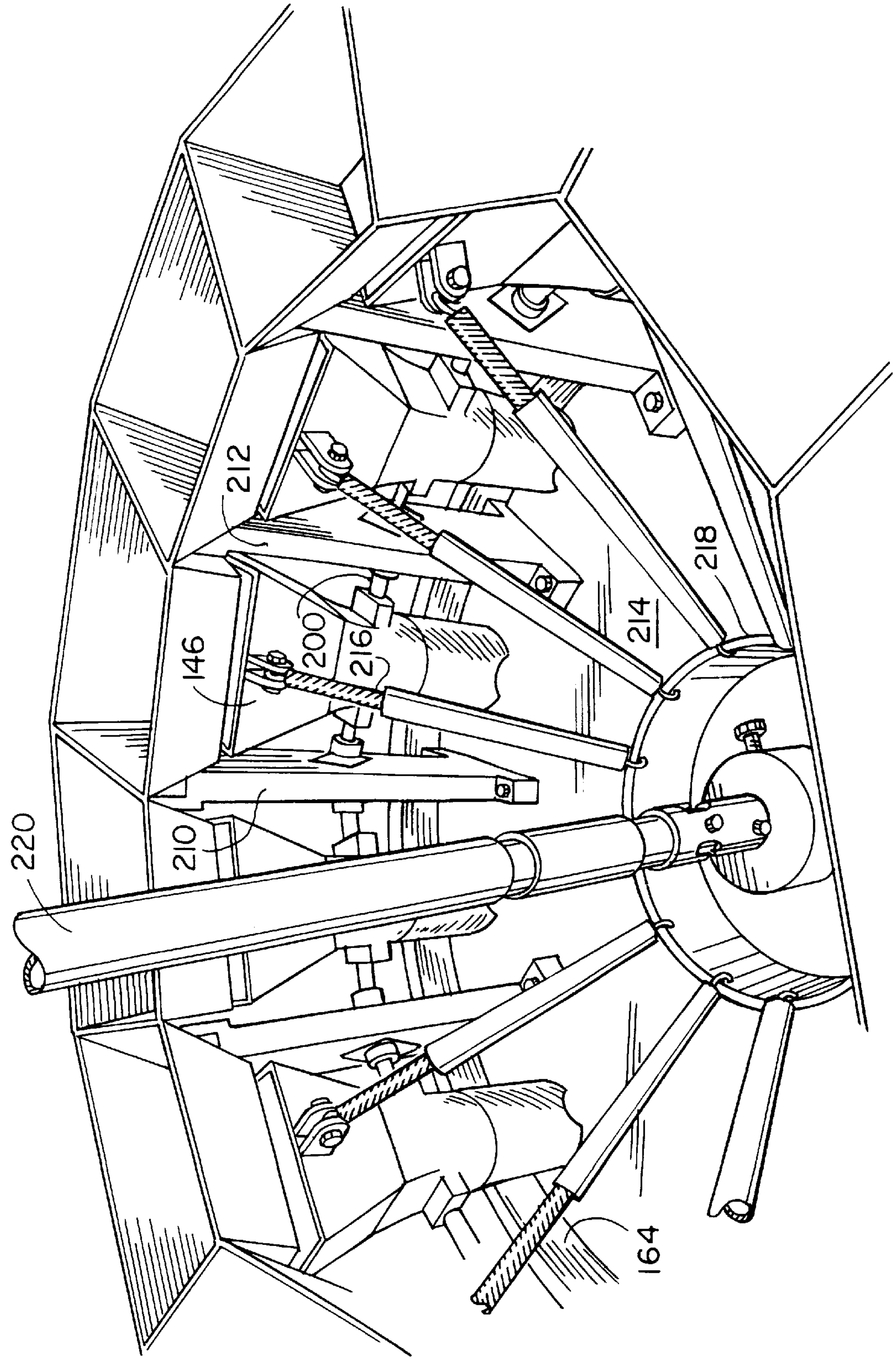
FIG. 12 is a schematic view of the interior of the sorting system of this invention showing the spring-biased pivotable feed hoppers in accordance with this invention.

Fixed frame portion 142, FIG. 8, of sorting system 24 further includes utensil stop plate 190, FIG. 10 and knock-off bar 52 shown more clearly in FIG. 11. Each feed hopper, such as shown for hopper 146, FIG. 12, is pivotably attached to shaft 200 extending between upright members 210 and 212 fixed to rotating table 214. In this way, hopper 146 is biased to tilt outward as shown in FIG. 8 at the open portion of upper stationary cam 164 the interior of which is shown in FIG. 12, via spring mechanism 216 attached to collar 218. Also shown in FIG. 12 is shaft 220 which is connected to motor 222, FIG. 1, which rotates both the rotating portion 140 of sorting system 24, FIG. 8, and upper pulley 70, FIG. 3 of pick-up and transport system 26, FIG. 1, to insure that the rotation of the pick-up and transport belt and the rotation of the rotating portion of sorting system 24 are synchronized. In this way, only one piece of flatware is delivered to each upper hopper receptacle 144, FIG. 8, at a type via knock-off bar 52, FIG. 11.

The operation of flatware sorting machine 10, FIG. 1, is best explained from the perceptive of an individual piece of flatware. The individual piece of flatware is initially lying in rotating feed bin 12, FIG. 6, and is picked up by magnetic member 100. If it is also picked up by adjacent magnetic member 98, knock-down mechanism 96 dislodges it from magnetic member 98. The individual piece of flatware is now hanging vertically from and oriented on the magnetic member either handle up as shown for spoon 37, FIG. 1, or handle down, as shown for fork 41. Belt 28 now brings the piece of flatware up and over sorting system 24 until knock-off bar 52, FIG. 11, dislodges it from the magnetic member.

The handle of each piece of flatware oriented handle down is then guided by upper hopper receptacle 144 into feed hopper 146, FIG. 8, which is kept vertical by upper stationary cam 164 at the point and time when knock off bar 52 separates the piece of flatware from its magnetic carrier. The handle is then fed by lower hopper receptacle 148 and through an opening in closed sorting jaws 150 and 152 until the head of the flatware is stopped by the jaws. Stop 190, FIG. 10, is used to prevent the knife serrations from coming into contact with the metal jaws to prevent wear thereof and to stop the handle of all flatware oriented handle down.

At first sorting station 160, FIG. 8, pivotable hopper 146 is now free to pivot into the position shown in FIG. 8 due to the open section of upper stationary cam 164. Since the pieces of flatware are oriented handle down, however, this pivoting action has no effect on flatware oriented handle down as the handle is clear of the feed hopper. Sorting jaws 150, 152 then open sightly to let knives pass therethrough first, then open a little bit more to allow forks to pass therethrough, then open a little bit more to allow teaspoons to pass therethrough, and finally open all the way to allow soup spoons to pass therethrough. Thus all handle down flatware is properly sorted according to type at first sorting station 160, FIG. 8. The extent to which the sorting jaws open at each portion of the sorting stations will depend on the particular type of flatware used at the site of installation.

If, on the other hand, the flatware drops into feed hopper 146 handle end up, when hopper 146 pivots into the position shown in FIG. 8, the handle is wedged against lower hopper receptacle 148 thus preventing flatware oriented handle side up from being sorted at first sorting station 160. Just after first sorting station 160, FIG. 8, the pivotable hoppers are again driven into a vertical orientation via upper stationary cam 164. At this point, lower stationary cam 170 dips slightly as shown at 230, FIG. 8 and FIG. 13, thus allowing lifter block 154 to pivot upwards until it mates with fixed ledge 232, FIG. 13, attached to stationary frame portion 142, FIG. 8, of sorting system 24 between first sorting station 160 and second sorting station 162.

Figure 13:
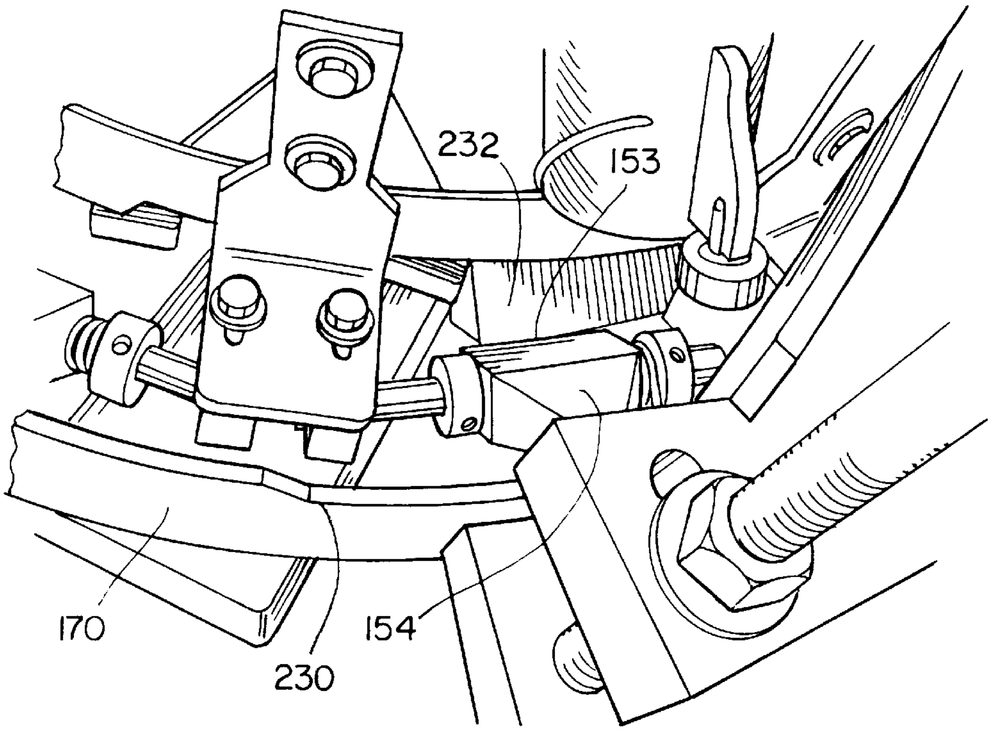
FIG. 13 is a schematic view of the lifter blocks of the sorting system of this invention.
Figure 14:
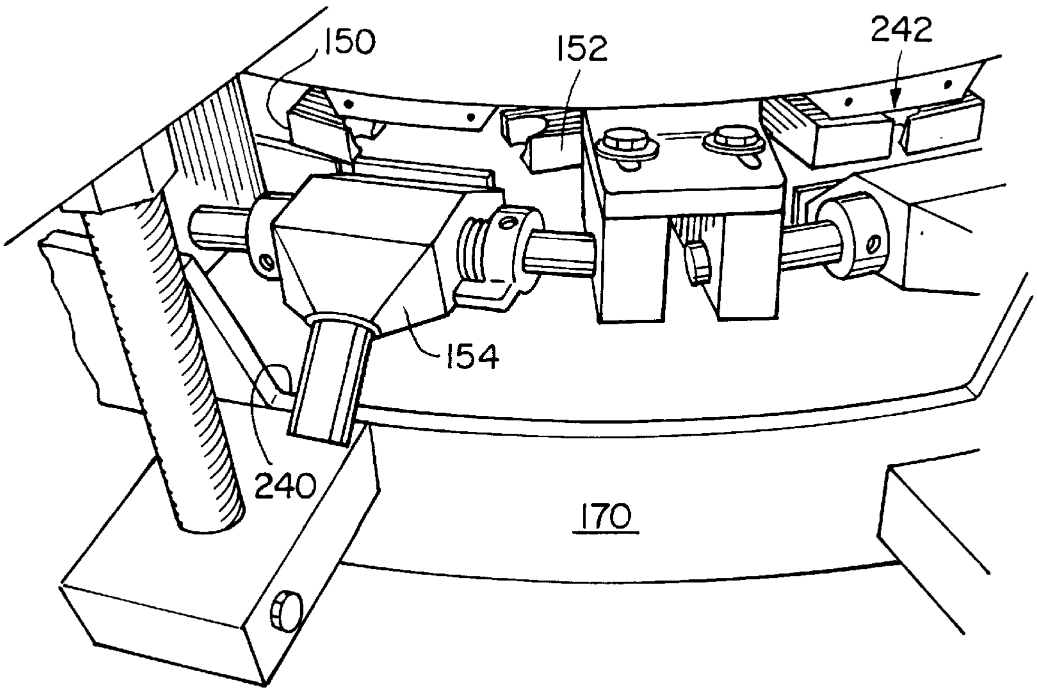
FIG. 14 is a schematic view depicting the operation of the lifter blocks of the sorting system of the subject invention.

It is also at this point and time when the sorting jaws completely open and the flatware oriented handle end up drops down until stopped by the V-shaped trough 153 defined by lifter block 154 and fixed ledge 232, FIG. 13. Lower stationary cam then steps down even further as shown at 240, FIG. 14 allowing lifter block 154 to rotate to an almost horizontal position thus pushing the head of each piece of flatware up through fully open jaws 150 and 152 so they can close as shown at 242. This action rests the head of the piece of flatware in jaws 150 and 152 and allows for sorting at second sorting station 162, FIG. 10, where, again, the jaws open slightly to sort knives, open more to sort forks, open even more to sort teaspoons, and open fully to sort soup spoons thus properly sorting all handle end flatware at second sorting station 162. In this way, sorting system 24, FIG. 8, sorts flatware both according to type and orientation.

Figure 15:
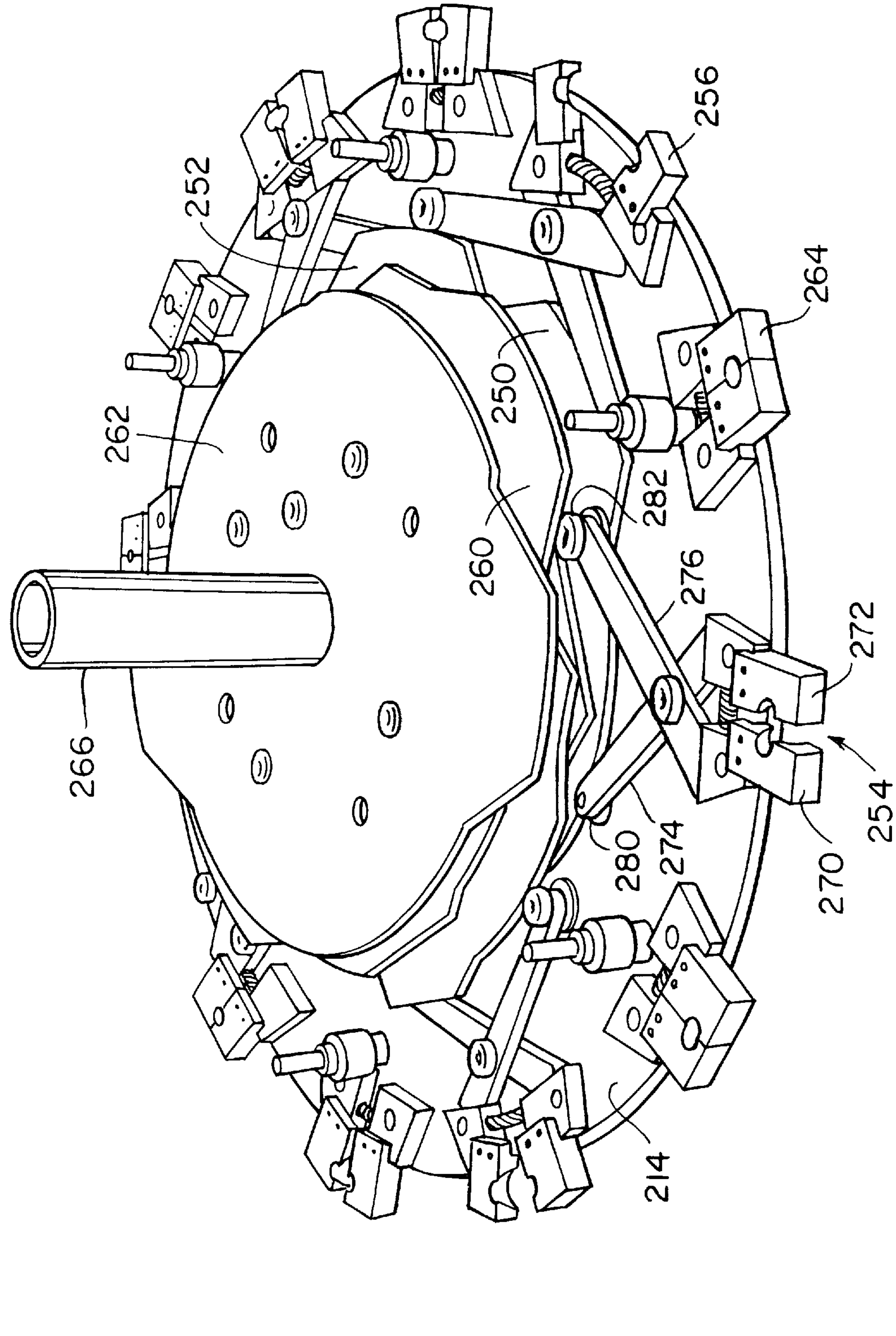
FIG. 15 is a schematic view of the cam mechanism for operating the sorting jaws of the sorting system of this invention.

The operation of the sorting jaws is discussed in more detail with reference to FIG. 15. Cams 250, 252, 260, and 262 sequentially open and close the jaw members to sort the flatware according to type at both sorting stations. Lower cams 250 and 252 operate every other pair of jaws 254, 256 while upper cams 260 and 262 operate each pair of jaws therebetween, such as jaw pair 264. Cams 250, 252, 260, and 262 do not rotate and are held fixed in place about fixed collar 266 surrounding the drive shaft (not shown) for the upper belt pulley and the rotating portion of the sorting system. Each sorting jaw assembly includes jaw heads 270 and 272 attached to scissor arms 274 and 276. Scissor arm

276 includes cam follower 280 which cooperates with cam 250 while scissor arm 274 includes cam follower 282 which cooperates with cam 252. Sorting jaw pair 264 is similar except its scissor arms (not shown) are raised above the plane of scissor arms 276 and 274 to save space and includes similar cam followers which cooperate with cams 260 and 262, respectively.

Figure 16:
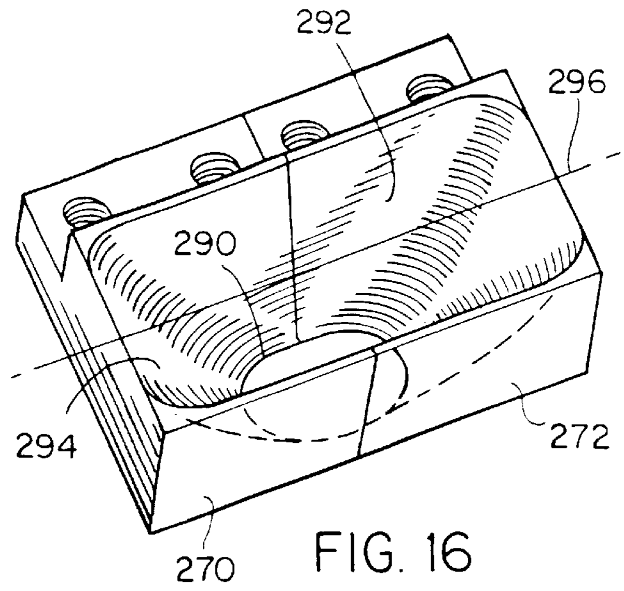
FIG. 16 is a schematic view of the jaw heads of the sorting jaws shown in FIG. 15.

The jaw heads 270, 272, FIG. 16, in the fully closed position define opening 290 which, as discussed above, allows the handle of each individual piece of flatware oriented handle end down to slide therethrough and concave cup-shaped portion 292 and 294 for retaining the head of an individual piece of flatware and also for urging the flatware to twist until it lies generally parallel to longitudinal axis 296 and to remain captured by the jaw heads in that position until they successively open wider and wider, as discussed above, to properly sort first knives, then forks, then teaspoons, and finally soup spoons into their correct receiving bin.

Thus, in summary, the flatware sorting machine of this invention includes rotating feed bin 12, FIGS. 1, 5 and 6; and flatware pick-up and transport system 26, FIG. 1. Flatware pick-up and transport system 26, FIG. 1, includes knock-down mechanism 96, FIGS. 5 and 6, magnetic grasping members 36, 38 and 40 attached via a flexible chain to transport belt 28, FIGS. 1, 2, 5, 6, and 7. Flatware pick-up and transport system 26, FIG. 1 also includes upper pulley 70, FIGS. 3, 4, and 11 and lower pulley 68, FIGS. 3, 5, and 6 and tensioning mechanism 72, FIGS. 3, 5, and 11. The other primary component of flatware pick-up and transport system 26, FIG. 1, is flatware knock-off bar 52, FIGS. 1, 8, and 11.

Flatware sorting machine 10, FIG. 1, of this invention also includes sorting system 24, FIG. 1, which includes fixed frame portion 142, FIGS. 8–10, and rotating portion 140. The rotating portion 140 includes twelve upper hopper receptacles, twelve pivotable feed hoppers, twelve lower hopper receptacles, twelve pairs of corresponding sorting jaws, and twelve corresponding lifter blocks.

Fixed frame portion 142 includes an upper stationary cam 164, FIG. 8, which functions to keep the hoppers horizontal except at the first sorting station where the upper stationary cam has an open section which allows the hoppers to spring to a tilted position as shown in FIG. 8. This action ensures that handle-up flatware retained in the feed hoppers and not sorted at the first sorting station. There is also lower stationary cam 170, which functions to keep the lifter blocks vertical and clear from the sorting operation except in two places: first, right after the first sorting station where the lower stationary cam includes a step down portion as shown at 230, FIGS. 8 and 13 which allows the lifter blocks to tilt slightly and cooperate with fixed ledge 232, FIG. 13, to keep flatware oriented handle end up from dropping between the jaws when they are fully open and second, directly before the second sorting station where the stationary lower cam includes even a larger step down portion 240, FIGS. 9 and 14 which allows the lifter blocks to spring to a nearly horizontal position thereby pushing the handle end up flatware back up through the jaws so the jaws can properly close before the sorting operation again begins at second sorting station 162, FIGS. 9 and 10, which sorts handle end up flatware according to type.

The drive mechanisms of this invention include motor 222, FIG. 1, for driving the rotating portion of the sorting system and, via shaft 220, FIGS. 8–12, to drive upper pulley 70, FIGS. 3, 4, and 9–11 of the flatware pick-up and transport system. Motor 16, FIG. 1, drives rotating sombrero-shaped feed bin 12, FIGS. 1, and 5–6. The cam mechanism which operates the opening and closing of sorting jaws 150, 152, FIGS. 8, 14, 15, and 16 is discussed with reference to FIG. 15. In an alternative embodiment, one motor could be used in conjunction with the appropriate reduction mechanisms and drive mechanism to operate all the moving components of the sorting machine of this invention.

Although specific features of this invention are shown in some drawings and not others, this is for convenience only as each feature may be combined with any or all of the other features in accordance with the invention. For example, the pick-up and transport system may be used in conjunction with other sorting devices.

Other embodiments will occur to those skilled in the art and are within the following claims:

What is claimed is:

1. A flatware sorting machine comprising:

a feed bin for holding unsorted flatware;

a sorting system for sorting the flatware; and a flatware pick-up and transport system for retrieving the flatware from said feed bin and transporting them to said sorting system, the flatware pick-up and transport system including:

a transport mechanism, a plurality of individual flatware grasping means connected to said transport mechanism for retrieving individual pieces of flatware from said feed bin, and a drive subsystem for driving said transport mechanism to bring the grasping means into contact with the unsorted flatware in the feed bin and for transporting the grasping means to the sorting system, and means for transferring flatware from the grasping means to the sorting system, each said grasping means including a hollow body, a pair of magnets disposed within said hollow body and separated by a spacing spring, and a driver in contact with one magnet through the body for adjusting the spacing between the two magnets to thereby vary the magnetic strength of the grasping means.

2. A flatware sorting machine comprising:

a feed bin for holding unsorted flatware;

a sorting system for sorting the flatware, the sorting system including:

a frame portion defining a first sorting station for sorting flatware handle end down and a second sorting station for sorting flatware handle end up, and a rotating portion disposed within said frame; and a flatware pick-up and transport system for retrieving the flatware from said feed bin and transporting them to said sorting system, the flatware pick-up and transport system including:

a transport mechanism, a plurality of individual flatware grasping means connected to said transport mechanism for retrieving individual pieces of flatware from said feed bin, and a drive subsystem for driving said transport mechanism to bring the grasping means into contact with the unsorted flatware in the feed bin and for transporting the grasping means to the sorting system, and means for transferring flatware from the grasping means to the sorting system.

3. The flatware sorting machine of claim 2 in which said rotating portion includes:

a plurality of feed hoppers disposed to receive flatware from said pick-up and transport mechanism;

a corresponding plurality of sorting jaw members disposed beneath said feed hoppers and operable between a closed position and plurality of open positions; and means for sequentially opening and closing said jaw members to sort said flatware according to type.

4. The sorting machine of claim 2 in which said frame portion includes a stationary upper cam having an open section proximate said first sorting station.

5. The sorting machine of claim 4 in which each feed hopper includes a cam follower which cooperates with said stationary upper cam and a spring biased pivoting mechanism which allows the hoppers to tilt at the open section of said stationary upper cam proximate said first sorting station.

6. The flatware sorting machine of claim 2 in which said frame portion further includes a stationary lower cam having a step down portion section between said first sorting station and said second sorting station.

7. The flatware sorting machine of claim 6 in which said rotating portion further includes a plurality of spring-biased lifter blocks each disposed beneath said sorting jaw members.

8. The flatware sorting machine of claim 7 in which said lifter blocks each include a cam follower which cooperates with said lower stationary cam to allow said lifter blocks to spring up towards said jaw members at the step down portion of said stationary lower cam.

9. A flatware sorting machine comprising:

a feed bin for holding unsorted flatware;

a sorting system for sorting the flatware, said sorting system including:

means for sorting flatware according to type including a plurality of sorting jaw members operable between a closed position and a plurality of different open positions, and means for sorting flatware according to orientation; and a flatware pick-up and transport system for retrieving the flatware from said feed bin and transporting them to said sorting system, the flatware pick-up and transport system including:

a transport mechanism, a plurality of individual flatware grasping means connected to said transport mechanism for retrieving individual pieces of flatware from said feed bin, and a drive subsystem for driving said transport mechanism to bring the grasping means into contact with the unsorted flatware in the feed bin and for transporting the grasping means to the sorting system; and means for transferring flatware from the grasping means to the sorting system.

10. The flatware sorting machine of claim 9 in which said means for sorting flatware according to orientation includes two separate sorting stations, a first sorting station for sorting flatware oriented handle end down according to type and a second sorting station for sorting flatware oriented handle end up according to type.

11. The flatware sorting machine of claim 10 in which said first station includes means for capturing the handle of flatware oriented handle end up until it reaches said second sorting station.

12. The flatware sorting machine of claim 11 in which said means for capturing includes a stationary upper cam and a plurality of pivotable, spring-biased feed hoppers disposed above said sorting jaw members, each said feed hopper including a cam follower which cooperates with said upper stationary cam to maintain the hoppers in a vertical orientation, said upper stationary cam including an open portion proximate said first sorting station where said hoppers are free to pivot thereby wedging the handle of said flatware oriented handle end up in said feed hopper.

13. The flatware sorting machine of claim 10 in which said means for sorting further includes a lower stationary cam and a plurality of spring-biased pivotable lifter blocks disposed below said sorting jaw members, each said lifter block including a cam follower which cooperates with a lower stationary cam to selectively orient said lifter blocks with respect to said sorting jaw members.

14. The flatware sorting machine of claim 13 in which said stationary lower cam has a step down portion between said first sorting station and said second sorting station for allowing said lifter blocks to pivot upward thereby pushing flatware oriented handle end up above said jaw members.

15. The flatware sorting machine of claim 10 in which said sorting system further includes a camming mechanism for sequentially opening said sorting jaw members to wider spacings at said first sorting station, for closing said jaw members before the second sorting station, and for again sequentially opening said jaw members to wider spacings at said second sorting station, and for then closing said jaw members.

16. A flatware sorting machine comprising:

a feed bin for holding unsorted flatware;

a sorting system for sorting the flatware including:

a frame portion defining a first sorting station for sorting flatware handle end down and a second sorting station for sorting flatware handle end up, and a rotating portion disposed within said frame, said rotating portion including:

a plurality of feed hoppers disposed to receive flatware from said pick-up and transport mechanism, a corresponding plurality of sorting jaw members disposed beneath said feed hoppers and operable between a closed position and plurality of open positions, and means for sequentially opening and closing said jaw members to sort said flatware according to type.

* * * * *